US008515410B1

(12) United States Patent
Bach

(10) Patent No.: US 8,515,410 B1
(45) Date of Patent: Aug. 20, 2013

(54) ENABLING DIFFERENT BASE STATION ES LEVELS BASED ON TIME TO ACTIVATE CELL

(75) Inventor: Michael J. Bach, Kildeer, IL (US)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/476,466

(22) Filed: May 21, 2012

(51) Int. Cl.
  *H04M 3/00* (2006.01)
(52) U.S. Cl.
  USPC ......... 455/418; 455/419; 455/456.6; 455/574
(58) Field of Classification Search
  USPC ............................... 455/574, 456.6, 418, 419
  See application file for complete search history.

(56) References Cited

U.S. PATENT DOCUMENTS

| 2012/0008512 | A1* | 1/2012 | Wahlqvist et al. | 370/252 |
| 2012/0015657 | A1* | 1/2012 | Comsa et al. | 455/436 |
| 2012/0082064 | A1* | 4/2012 | Awoniyi et al. | 370/255 |

OTHER PUBLICATIONS

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pgs.
3GPP TS 36.423 V11.0.0, "3rd Generation Partnership Project; Technical Specification Group Radio Access Network; Evolved Universal Terrestrial Radio Access (E-UTRAN); X2 application protocol (X2AP) (Release 11)", Mar. 2012, 134 pgs.
3GPP TR 32.834 V11.0.0, "3rd Generation Partnership Project; Technical Specification Group Services and System Aspects' Study on Operations, Administration and Maintenance (OAM) aspects of inter-Radio—Access-Technology (RAT) energy saving (Release 11)", Jan. 2012.
3GPP TS 32.522 V11.1.0, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", Dec. 2011, 32 pgs.
3GPP TR 36.927 V10.1.0, "3rd Generation Partnership Project; Technical Specification Group Radio Access Network; Evolved Universal Terrestrial Radio Access (E-UTRA); Potential solutions for energy saving for E-UTRAN (Release 10)", Sep. 2011, 22 pgs.
3GPP TS 32.762 V10.5.0, "3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 10)".

* cited by examiner

*Primary Examiner* — Kwasi Karikari
(74) *Attorney, Agent, or Firm* — Harrington & Smith

(57) ABSTRACT

An exemplary method includes communicating an indication corresponding to at least a length of time it should take to reactivate a cell from an energy savings level corresponding to the indication to a fully activated state, and placing the cell into the energy savings level corresponding to the indication. Another method includes selecting an energy savings level for a cell, the energy savings level corresponding to a length of time it should take to reactivate the cell from the energy savings level to a fully activated state, and communicating to the cell an indication corresponding to at least the length of time it should take to reactivate a cell from the selected energy savings to the fully activated state. Apparatus and program products are also disclosed.

24 Claims, 11 Drawing Sheets

Table 5.1-1 Criteria for energy saving state

| Criterion | notEnergySaving state | energySaving state |
|---|---|---|
| Degree of energy saving effect | The cell in notEnergySaving state will not consider energy saving as the first priority, but it is left to the vendor implementation how to minimize energy consumption while providing service availability. This minimization may include switching off hardware elements. | The energySaving state represents the maximum energy saving effect on the cell level. Hardware components shall be switched off for energy saving purpose as far as possible. Which hardware components are switched off is an issue specific to NE implementation. |

FIG. 2

| >Deactivation Indication | | O | | ENUMERATED( deactivated, ...) | Indicates the concerned cell is switched off for energy saving reasons |
| --- | --- | --- | --- | --- | --- |
| >eslevel | | O | | ENUMERATED( first, second, third, rxonly, ...) | First, second and third es level all mean the cell is not transmitting or receiving and indicate it takes milliseconds, seconds, minutes respectively to reactivate. rxonly es level indicates the cell is receiving but not transmitting and needs on the order of milliseconds to reactivate tx. |

| >Deactivation Indication | O | | ENUMERATED(deactivated, ...) | Indicates the concerned cell is switched off for energy saving reasons |
|---|---|---|---|---|
| >eslevel | O | | ENUMERATED(short, medium, long, ...) | Indicates expected time it will take to reactivate the concerned cell. Short, medium, long correspond to milliseconds, seconds and minutes respectively to activate |

| >Deactivation Indication | O | | ENUMERATED(deactivated, ...) | Indicates the concerned cell is switched off for energy saving reasons |
|---|---|---|---|---|
| >Time to Activate | O | | INTEGER (0..4095) | Indicates the length of time (using simple rounding) it will take to reactivate the concerned cell in seconds. |

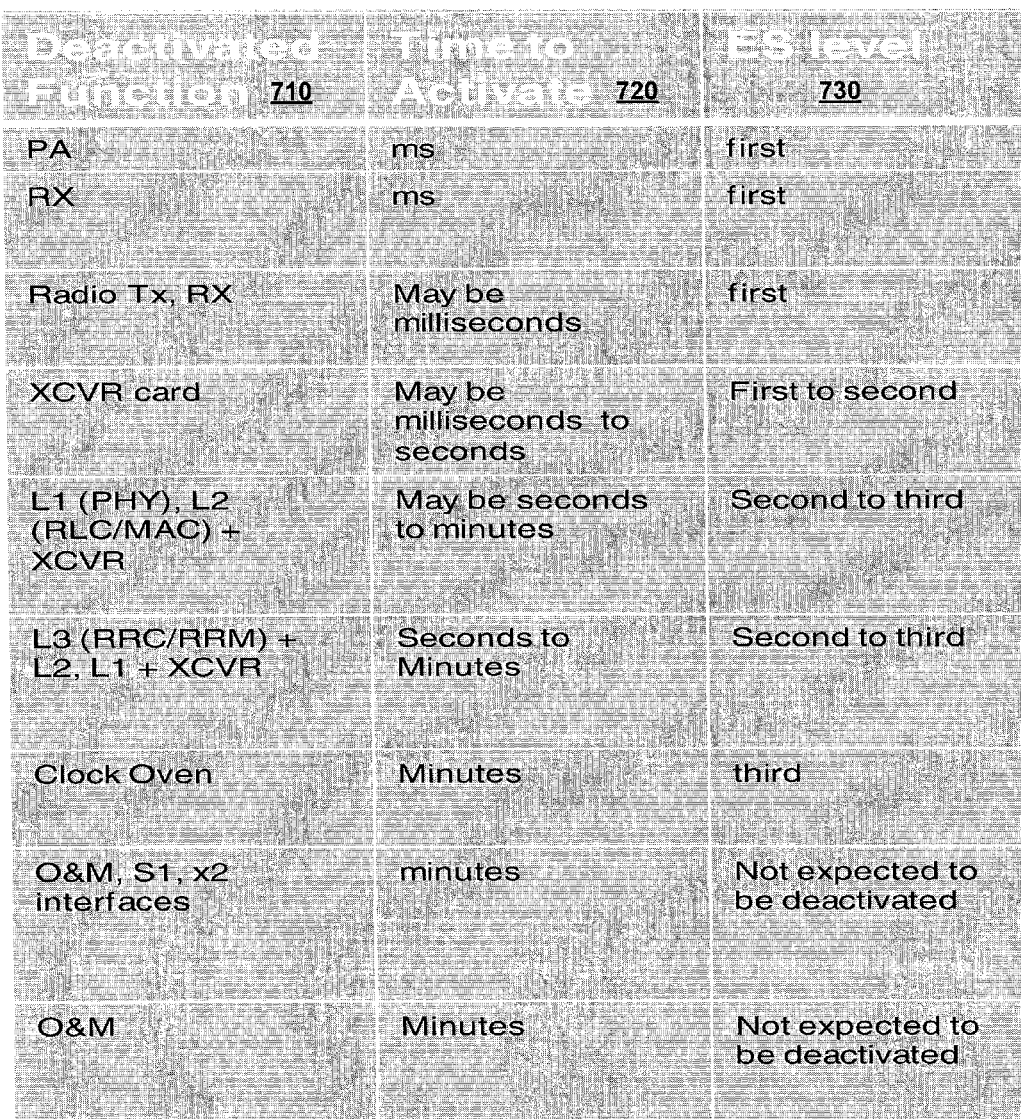

| Deactivated Function 710 | Time to Activate 720 | ES level 730 |
|---|---|---|
| PA | ms | first |
| RX | ms | first |
| Radio Tx, RX | May be milliseconds | first |
| XCVR card | May be milliseconds to seconds | First to second |
| L1 (PHY), L2 (RLC/MAC) + XCVR | May be seconds to minutes | Second to third |
| L3 (RRC/RRM) + L2, L1 + XCVR | Seconds to Minutes | Second to third |
| Clock Oven | Minutes | third |
| O&M, S1, x2 interfaces | minutes | Not expected to be deactivated |
| O&M | Minutes | Not expected to be deactivated |

FIG. 7

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Activate | | 1 .. <maxCellineNB> | | | GLOBAL | reject |
| >ECGI | M | | 9.2.14 | | | |
| >eslevel | O | | 9.2.x.y | | - | - |

FIG. 8

| IE/Group Name | Presence | Range | IE type and reference | Semantics description | Criticallt y | Assigned Criticality |
|---|---|---|---|---|---|---|
| eslevel | M | | ENUMERATED (first, second, third, rxonly, ...) | First, second and third es level all mean the cell is not transmitting or receiving over Uu and indicate it takes milliseconds, seconds, minutes respectively to reactivate. rxonly es level indicates the cell is receiving but not transmitting and needs on the order of milliseconds to reactivate tx. | - | - |
| | | | | | | |

FIG. 9

ENABLING DIFFERENT BASE STATION ES LEVELS BASED ON TIME TO ACTIVATE CELL

TECHNICAL FIELD

This invention relates generally to wireless networks and, more specifically, relates to base station energy savings (ES) modes in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

C-SON Centralized Self Optimizing Network
DL DownLink (from base station to user equipment)
eNB or eNode B evolved Node B (LTE base station)
ES Energy Savings
HO HandOver
IE Information Element
L1 a physical layer (e.g., PHY)
L2 a data link layer (e.g., RLC/MAC)
L3 a network layer (e.g., RRC/RRM)
LTE Long Term Evolution
MAC Media Access Control
MDT Minimization Drive Testing
MME Mobility Management Entity
O&M Operations and Maintenance
PA Power Amplifier
PDCP Packet Data Convergence Protocol
RAN Radio Access Network
Rel Release
Rx or RX receiving or receiver
RLC Radio Link Control
RRC Radio Resource Control
RRM Radio Resource Management
SGW Serving GateWay
SON Self Optimizing Network
Tx or TX transmitting or transmitter
UE User Equipment
Uu LTE air interface
XCVR transceiver An Energy Savings (ES) method via deactivating unneeded eNB cell(s) has been a supported functionality in LTE since Rel-9. 3GPP TS 36.423 V11.0.0 (2012-03), section 8.3.11 (Cell Activation) provides details for the X2 application protocol (X2AP) including the Cell Activation procedure used to request to a neighboring eNB to switch on one or more cells, previously reported as inactive due to energy saving reasons. 3GPP TS 36.300 V11.0.0 (2011-12), provides the Overall E-UTRA and E-UTRAN description where section 22.4.4.2 ("Solution description"), currently contains the following text regarding support for Energy Savings:

"All informed eNBs maintain the cell configuration data also when a certain cell is dormant. ENBs owning non-capacity boosting cells may request a re-activation over the X2 interface if capacity needs in such cells demand to do so. This is achieved via the Cell Activation procedure."

Thus, cell re-activation occurs when "capacity needs demand to do so". It can also be seen that cells may enter an inactive or an active state. While this may increase energy saving as compared to having all cells active, additional improvements are also possible.

SUMMARY

This section contains examples of possible implementations and is not meant to be limiting.

In an exemplary embodiment, a method includes communicating an indication corresponding to at least a length of time it should take to reactivate a cell from an energy savings level corresponding to the indication to a fully activated state, and placing the cell into the energy savings level corresponding to the indication.

In an additional exemplary embodiment, an apparatus includes means for communicating an indication corresponding to at least a length of time it should take to reactivate a cell from an energy savings level corresponding to the indication to a fully activated state; and means for placing the cell into the energy savings level corresponding to the indication.

Another exemplary embodiment includes a computer program product comprising a computer-readable storage medium bearing computer program code embodied therein for use with an apparatus. The computer program code includes code for communicating an indication corresponding to at least a length of time it should take to reactivate a cell from an energy savings level corresponding to the indication to a fully activated state; and code for placing the cell into the energy savings level corresponding to the indication.

A further exemplary embodiment is an apparatus including one or more processors and one or more memories including computer program code. The one or more memories and the computer program code are configured, with the one or more processors, to cause the apparatus to perform at least the following: communicating an indication corresponding to at least a length of time it should take to reactivate a cell from an energy savings level corresponding to the indication to a fully activated state; and placing the cell into the energy savings level corresponding to the indication.

In an additional exemplary embodiment, a method includes selecting an energy savings level for a cell, the energy savings level corresponding to a length of time it should take to reactivate the cell from the energy savings level to a fully activated state; and communicating to the cell an indication corresponding to at least the length of time it should take to reactivate a cell from the selected energy savings to the fully activated state.

In a further exemplary embodiment, an apparatus includes means for selecting an energy savings level for a cell, the energy savings level corresponding to a length of time it should take to reactivate the cell from the energy savings level to a fully activated state; and means for communicating to the cell an indication corresponding to at least the length of time it should take to reactivate a cell from the selected energy savings to the fully activated state.

Another exemplary embodiment includes a computer program product comprising a computer-readable storage medium bearing computer program code embodied therein for use with an apparatus. The computer program code includes code for selecting an energy savings level for a cell, the energy savings level corresponding to a length of time it should take to reactivate the cell from the energy savings level to a fully activated state; and code for communicating to the cell an indication corresponding to at least the length of time it should take to reactivate a cell from the selected energy savings to the fully activated state.

A further exemplary embodiment is an apparatus including one or more processors and one or more memories including computer program code. The one or more memories and the computer program code are configured, with the one or more processors, to cause the apparatus to perform at least the following: selecting an energy savings level for a cell, the energy savings level corresponding to a length of time it should take to reactivate the cell from the energy savings level to a fully activated state; and communicating to the cell an indication corresponding to at least the length of time it should take to reactivate a cell from the selected energy savings to the fully activated state.

BRIEF DESCRIPTION OF THE DRAWINGS

In the attached Drawing Figures:

FIG. 2 is a portion of a table of criteria for an energy saving state from 3GPP TR 32.834 V11.0.0 (2012-01);

FIGS. 4, 5, and 6 are tables showing exemplary embodiments that introduce a new X2AP IE ("eslevel") added to the eNB Configuration Update procedure in 3GPP TS 36.423;

FIG. 7 is a table illustrating examples of eNB functions and corresponding proposed associated eslevels if the functions are deactivated for ES reasons;

FIG. 8 is a table illustrating IEs in a new CELL ACTIVATION REQUEST message;

FIG. 9 is a table illustrating information about an eslevel IE;

DETAILED DESCRIPTION OF THE DRAWINGS

Figure 1:
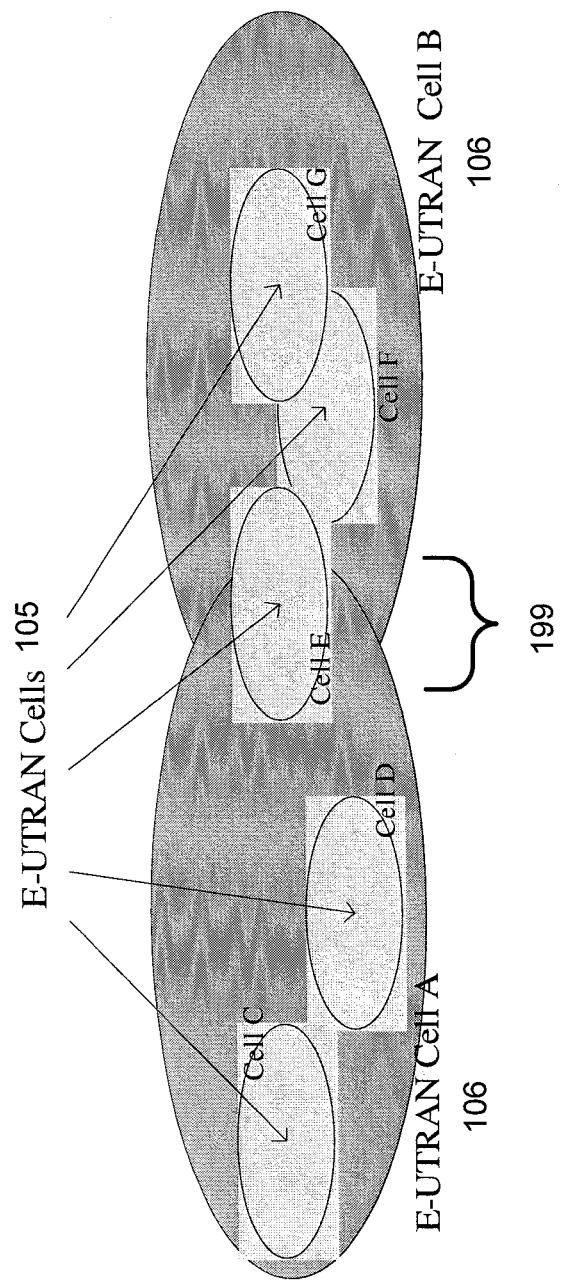
FIG. 1 is an example showing two coverage cells A and B and multiple capacity booster cells.

FIG. 1 is an example showing two coverage cells 106 (cells A and B) and multiple capacity booster cells 105 (cells C-G). It is noted that this example also shows coverage areas of the cells. The capacity booster cells 105 have coverage areas that underlie the (overlying) coverage areas of the coverage cells, and reference 199 shows an area where the coverage areas of the two capacity booster cells 106 overlap. This is a simple (e.g., single-carrier) scenario that helps to illustrate a system into which energy savings might be performed. For instance, 3GPP RAN3 has specified the following Energy Saving (ES) application scenario since R9: Where capacity booster cell(s) (e.g. a cell such as C) can turn off given its traffic load is under its switch-off threshold and coverage cell (e.g., A) is under its configured switch-off threshold for time duration in order to optimize energy consumption. This may first include handing over UEs to coverage cell A for offload with the switch off ongoing X2 Mobility cause. Neighbor cells are notified via the Deactivation Indication IE in the X2AP: ENB Configuration Update message.

As macro coverage cell A exceeds configured traffic switch-on threshold for given duration, the macro coverage cell may send an X2:Cell Activation Request message to dormant cell(s) to switch-on. The Cell Activation Request message is described in section 9.1.2.20 of 3GPP TS 36.423 V11.0.0 (2012-03).

FIG. 2 is a portion of a table of criteria for an energy saving state from 3GPP TR 32.834 V11.0.0 (2012-01). Per this table: "it is left to the vendor implementation how to minimize energy consumption while providing service availability", where the criterion for service availability in the energy saving state is the cell does not provide any service to UEs and is not visible to a UE.

Different levels of ES are achievable by different levels of turning off various eNB functions. However, turning the different functions back on likely requires different amounts of time at the capacity booster cell 105 (also called an original cell), which the coverage cell 106 (also called a candidate cell) may not be aware of or properly account for.

Currently no signaling exists, e.g., via X2AP, to indicate the different levels of energy savings a cell in energy savings state resides in or how long it takes to activate such a cell or thus to account for the significantly different possible delays before the cell can be placed on the air.

Thus, currently it is not clear how long of a time period is required in order to reactivate an eNB, and its corresponding cell or cells, that is dormant for energy savings. Exemplary embodiments herein enable specifying a degree of energy savings expected at a node, where the degree is based on the functionality turned off within an eNB implementation and the corresponding length of time needed to reactivate the functionality. This information may be indicated by a new IE in, e.g., the eNB CONFIGURATION UPDATE message. This invention also enables, in an exemplary embodiment, a means to specify placing a node in different energy savings level using the CELL ACTIVATION REQUEST message. Thus, an exemplary embodiment provides additions, e.g., to X2 message (e.g., in a distributed method) and/or O&M messaging (e.g., in a centralized method) to support configuring a cell for ES based on multiple levels of energy savings and corresponding times to reactivate the cell.

In a specific exemplary embodiment, for instance, methods are described whereby a cell is configured for ES, e.g., in 3GPP TS 32.522, in the following manner. If control (e.g., for ES) is centralized, the cell is configured to go into different levels of ES (e.g., first, second, third) depending on the degree of ES desired combined with the time acceptable to reactivate the cell. If control is distributed, the cell is configured to be allowed to go into different levels of ES (e.g., first, second, third) depending on the degree of ES desired versus the time necessary to reactivate the cell. Load thresholds of nodes (e.g., original and candidate) may be provided for entering and leaving the different ES levels (also referred to as "eslevels" herein). Alternatively, threshold(s) can be determined as a delta time period from other threshold(s). For example, the delta time period represents how much load is expected to change in a given time period. If a high load velocity is determined to be 15% (percent) of max load per minute and it takes two minutes to change from eslevel 2 to eslevel 1, then if the load threshold for eslevel 1 is x, the activation threshold for eslevel 2 is x–30. The delta time period may also be learned via historical data. Associated time durations before an ES level may occur also may be configured. The time duration controls how long the load must be at or exceed a trigger (e.g., load) threshold before the energy savings level change is allowed to occur and thus limits how fast cell activations and deactivations can change. This implies the threshold determined via a delta time period may be further adjusted by the load velocity multiplied by the time duration.

In another exemplary embodiment, a method is disclosed for enabling better targeting of energy saving techniques wherein a node indicates not only that the node is switched off in order to save energy via, e.g., a Deactivation Indication IE per existing 3GPP TS 36.423, but further indicates a level of energy savings reflected by different times the node can be expected to require in order to reactivate to full service from the indicated level.

Figure 3:
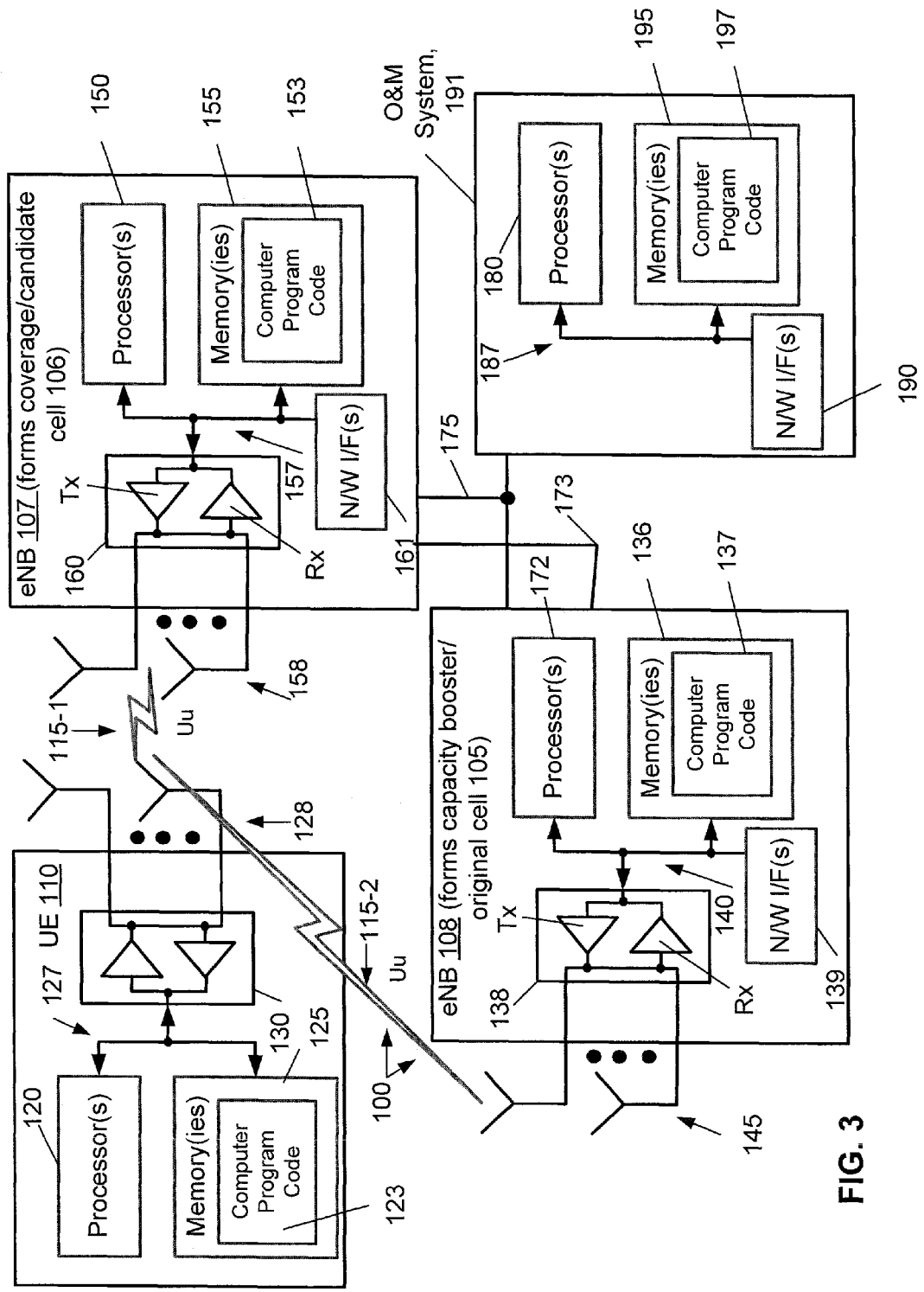
FIG. 3 illustrates an exemplary system in which the exemplary embodiments of the instant invention may be practiced.

Before proceeding with additional description regarding these aspects, reference is made to FIG. 3, which illustrates an exemplary system in which the exemplary embodiments of the instant invention may be practiced. In FIG. 3, a user equipment (UE) 110 is in wireless communication with a wireless network 100 via one of the wireless links 115-1 (with eNB 107) or the wireless link 115-2 (with pico eNB 108), where the wireless links 115 can implement a Uu interface. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The network 100 includes eNB 107, eNB 108, and O&M system 191. In the examples presented herein, the eNB 107 forms the coverage/candidate cell 106 (see FIG. 1) and the eNB 108 forms the capacity booster/original cell 105 (see FIG. 1). It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The eNodeB 107 includes one or more processors 150, one or more memories 155, one or more network interfaces (N/W I/F(s)) 161, and one or more transceivers 160 (each comprising a transmitter, Tx, and a receiver, Rx) interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNodeB 107 to perform one or more of the operations as described herein. The one or more network interfaces 161 communicate over networks such as the networks 173, 175.

The eNB 108 includes one or more processors 172, one or more memories 136, one or more network interfaces (N/W I/F(s)) 139, and one or more transceivers 138 (each comprising a transmitter, Tx, and a receiver, Rx) interconnected through one or more buses 140. The one or more transceivers 160 are connected to one or more antennas 145. The one or more memories 136 include computer program code 137. The one or more memories 136 and the computer program code 137 are configured to, with the one or more processors 172, cause the eNB 108 to perform one or more of the operations as described herein. The one or more network interfaces 139 communicate over networks such as the networks 173, 175.

The O&M system 191 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause the O&M system 191 to perform one or more of the operations as described herein. The one or more network interfaces 190 communicate over networks such as the networks 173, 175. Certain description herein refers to a C-SON server. Such a server normally connects to O&M system 191 and for purposes here can be considered part of O&M system 191.

The eNodeB 107 and the eNB 108 communicate using, e.g., network 173. The network 173 may be wired or wireless or both and may implement, e.g., an X2 interface as specified in TS 36.423. The O&M system uses the network 175 to communicate with the eNodeB 107 and eNB 108. The network 175 may be wired or wireless or both and may implement, e.g., an Itf-S. The computer readable memories 136, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150, 172, and 180 may be of any type suitable to the local technical environment, and may include one or more of general purpose computers, special purpose computers, microprocessors, digital signal processors (DSPs) and processors based on a multi-core processor architecture, as non-limiting examples.

As stated above, exemplary embodiments herein enable specifying a degree of energy savings expected at a node, where the degree is based on the functionality turned off within an eNB implementation and the corresponding time period needed to reactivate the functionality. For instance, an exemplary method of enabling better targeting of energy savings includes the following.

An original cell enters an energy savings level state based on original loads (of the original/capacity booster cell 105) and candidate loads (of the candidate/coverage cell 106) falling under threshold(s) for given duration(s) and may indicate the time period to reactivate in the X2: eNB CONFIGURATION UPDATE message (msg). The level of energy savings being reflected in different times the cell is expected to take in order to reactivate to full service from the indicated level.

There are multiple possibilities for indicating the level of energy savings and corresponding different time periods the cell is expected to take in order to reactivate to full service from the indicated level. FIG. 4 shows an example of a table illustrating an exemplary embodiment that introduces a new X2AP IE ("eslevel") added to the eNB Configuration Update procedure in 3GPP TS 36.423, e.g., see section 9.1.2.8. The IE/Group name is "eslevel", the presence is O (optional), there is no range, the IE type is enumerated (with the enumeration of first, second, third, rxonly shown), and the semantics is shown. In this example, first, second and third eslevel all mean the cell is not transmitting or receiving and indicate it takes milliseconds, seconds, minutes, respectively, to reactivate. The "rxonly" eslevel indicates the cell is receiving but not transmitting and needs on the order of milliseconds to reactivate Tx. Different levels of granularity are also possible, as well as "txonly" (i.e., receiver off, transmitter on). The first, second, third, and rxonly are indications 410-1 of energy savings levels into which a cell may be placed.

Instead of first, second, third, another possible, non-limiting terminology is high, medium, low to indicate (as indications 410) different levels of energy savings and corresponding different times the cell is expected to take in order to reactivate to full service from the indicated level. For instance, the term "high" indicates a high level of energy savings and a long time period (e.g., minutes) the cell is expected to take in order to reactivate to full service from the indicated level, while "low" indicates a relative lower level of energy savings and a corresponding relative short time period (e.g., milliseconds) the cell is expected to take in order to reactivate to full service from the indicated level.

FIG. 5 is a table illustrating additional terms and showing an exemplary embodiment that introduces a new X2AP IE ("eslevel") added to the eNB Configuration Update procedure in 3GPP TS 36.423. In this example, the enumerated types include short, medium, and long (as indications 410-2 of energy savings levels), and each of these types indicates an expected time (e.g., time period) it will take to reactivate the concerned cell. Short, medium, long correspond to milliseconds, seconds and minutes respectively to activate. FIG. 6 illustrates another possible example. FIG. 6 is a table illustrating another term and showing an exemplary embodiment that introduces a new X2AP IE ("eslevel") added to the eNB Configuration Update procedure in 3GPP TS 36.423. In this example, the IE/Group name is "Time to Activate", and enumerated type is an Integer from zero to 4095 (as indications 410-3 of corresponding energy savings levels, although there may be many fewer energy savings levels than indications), which indicates the length of time (e.g., using simple rounding) it will take to reactivate the concerned cell in seconds.

It should be noted that the terms "time", "time period", "length of time", and similar terms (e.g., "period of time") are terms used herein to describe some amount of time from when a cell begins to reactivate until the time the cell reactivates, that is, being fully active and transmitting LTE signals and channels over the Uu interface and receiving Uu signals and channels from the UE. So when activated the cell provides service to UEs and is visible to a UE. Thus, these terms for time are considered to be fungible herein.

The table 700 shown in FIG. 7 provides examples of eNB functions 710 and corresponding proposed associated eslevels (shown as ES level) 730 if the functions 710 are deactivated for ES reasons. The functions 710 that can be deactivated in an eNB 107/108 include the power amplifier (PA), receiver (RX), radio transmitter/receiver (Tx, RX), different sets of layers (e.g., one set being the L1, L2, and the transceiver, XCVR; the other set being L3 and lower layers), and the clock oven. FIG. 7 illustrates that it is possible to make a distinction between turning off functions associated with only one direction, i.e., either uplink or downlink turned off, versus turning off both the UL and DL functions. Also listed are the O&M and 51, and x2 interfaces, and the O&M (e.g., O&M system 191), but these are expected not to be deactivated as the eNB is expected to be able to communicate to O&M and neighbor nodes when deactivated, though in a centralized mode S1 and X2 interfaces may be deactivated. The "time to activate" 720 indicates a potential range of time periods in order to activate the corresponding deactivated eNB function 710. The corresponding ES level 730 shows possible associated indications 410 (first, second, or third) of the level of energy savings. The indications 410 of the level of energy savings may also be high, medium, and low; short, medium, long as in FIG. 5; or an integer as in FIG. 6, as examples.

It should be noted that the deactivated functions 710 include hardware in the eNB 107/108 such as the PA, Rx, Tx, XCVR card, and clock oven, and also computer program code (e.g., software, firmware) executed by the hardware, such as the L1, L2, and L3 layer functions. Also, the receiver and transmitter, for instance, typically have computer program code executed by the corresponding receiver and transmitter.

The table 700 may also be used by an eNB 107/108 to determine what ES level 730 the eNB is in and to report an indication 410 of same to, e.g., another eNB. For instance, if the PA, RX and Radio Tx, RX functions 710 are deactivated, then the ES level could be the "first" ES level 730 (assuming the XCVR card has an ES level of second), and an indication of the same could be reported by the eNB to, e.g., another eNB. Additionally, table 700 may be used by the eNB if an indication of the ES level 730 is received by the eNB to determine what function 710 can be deactivated (or reactivated). That is, if an indication of the "second" ES level is received by the eNB, the eNB can determine that the eNB has deactivated such functions 710 as the PA, RX and Radio Tx, RX such that reactivation time is on the order of milliseconds, if the eNB is moving from a fully activated state to a high energy savings level corresponding to the "first" ES level.

Thus, an indication of the ES level 730 may indicate to an original cell 105 by a new M (eslevel) added as part of the X2: CELL ACTIVATION REQUEST message to activate the cell to a given energy level of operation. In an exemplary embodiment, full activation is indicated by the eslevel IE not being included in the message. The original cell 105 should normally accept the request to activate and not go into an ES level requiring a greater reactivation time for at least some period of time that may be configured. The following is a new IE for 3GPP TS 36.423 being proposed in the following section.

9.1.2.20 CELL ACTIVATION REQUEST

This message is sent by an eNB to a peer eNB to request a previously switched-off cell/s to be re-activated.

Direction: $eNB_1 \rightarrow eNB_2$

FIG. 8 is a table illustrating IEs in a new CELL ACTIVATION REQUEST message. The "eslevel" IE/Group Name is added and would have a reference of section 9.2.x.y. Section 9.2.x.y could be entitled "eslevel" and state that "This IE indicates the energy usage level the node is requested to activate to". FIG. 9 is a table illustrating information about the eslevel IE, and the table would be part of section 9.2.x.y. In this example, the "eslevel" IE is mandatory, as indicated by the "M". The IE is optional as given in FIG. 8. If the IE is present, then the eslevel must be present as the eslevel is all that is in the IE in this example.

In an additional exemplary embodiment, the eslevel determination by the eNB 108/107 (e.g., a node) in addition may use historical data regarding how fast the load of the eNB changes. The historical data may be collected by the node itself and/or may be collected at a SON server and sent to the node for setting threshold(s) and duration(s). These functions would typically interface to the eNB by way of the O&M interface.

The eslevel determination may further be enhanced by using facts such as whether there are additional candidate cells operating on additional carriers and their activation, deactivation and eslevels. The presence thereof enables more time for the original cell to activate, thereby allowing original node to be in a higher eslevel for greater energy savings.

The original node may enter an energy savings state decreasing energy consumption further. For instance, after being in an particular eslevel state (e.g., as defined by deactivating certain functions 710) without receiving a reactivate request for a period of time, the node may proceed to a higher eslevel and may indicate such change in level and reactivation time to neighbors via an update sent using the X2: eNB CONFIGURATION UPDATE message with the updated eslevel.

A possible use case is as follows. Upon detection of coverage cell load and possibly neighbors on the same or other carriers surpassing threshold(s), the candidate cell 106 may request the original cell 105 to partially activate to an energy saving level as given by the optional eslevel IE in the CELL ACTIVATION REQUEST message, e.g. move the original cell 105 from second (seconds) to first (milliseconds) reactivate time from its dormant state. The coverage or candidate cell 106 activates node functions 710 of the capacity booster or original cell 105 to a level requiring a shorter time to fully reactivate as the need arises for shorter reactivation time, e.g., due to coverage cell(s) 106 approaching a point in time these cells 106 cannot handle more UEs 110 themselves (e.g., and therefore capacity booster cell 105 may be able to handle some of the UEs 110).

As another use case, the candidate cell 106 may request a dormant cell to never take longer than milliseconds to reactivate by, e.g., sending an Cell ACTIVATION REQUEST message with the eslevel IE value set to "first" (as an example) and continuing to repeat this message or by an additional indication requesting the dormant cell not to take longer times to reactivate. Such a capability is expected to be used when a cell needs to be available for reactivation and connection to UEs within a time period of milliseconds.

The original cell 105 may fail to enter a requested partial energy savings state, e.g., if the cell does not support such deactivation functionality or the IE itself. The original cell 105 in this case may return a CELL ACTIVATION FAILURE message with a new cause (e.g., "partial eslevel not supported"). If the cell 105 does not understand the new IE, the assigned criticality for the IE being set to reject can result in a CELL ACTIVATION FAILURE message being returned which allows the node to deduce this IE is not likely supported and no longer send the IE in a Cell Activation Request message. In an exemplary embodiment, the original cell 105 fully activates when not receiving the optional eslevel IE in the CELL ACTIVATION REQUEST message.

Based on receiving an indication of a cell's eslevel, an eNB can determine or learn the expected delay time from sending a CELL ACTIVATION REQUEST message until the eNB should receive a response message for the procedure. For example, whether the response is expected within milliseconds or minutes. If the delay associated with a reported eslevel is not initially known, the delay may be learned after receiving the reported eslevel value and measuring the delay to receive a response a few times. Knowing the expected delay can be helpful for setting guard timers for a procedure. When guard timers trigger, the trigger indicates the procedure has not completed successfully, e.g. a message has been lost.

In an exemplary embodiment, reception of an "rxlevel" value in the eslevel IE places the original cell in an energy savings level where there is no Uu transmission by the cell, but the cell's receiver (e.g., Rx in FIG. 3) is activated and preferably the cell 105 sends the X2:LOAD INFORMATION message. The existing UL Interference Overload Indication and/or the UL High Interference Indication IE received in the LOAD INFORMATION message may be used by the candidate cell 106 for deciding which original cells 105 to activate. The original cell 105 sets the value to high interference when received power surpasses a threshold used when in rxlevel, suggesting UE(s) would reside in the coverage area of the original cell 105 when activated if the original cell is a small cell (e.g., a pico node) within the candidate cell's coverage area, or an original node (e.g., macro or pico) cell will see strong interference from a neighbor in the case of a neighbor node that is causing the interference. In an overlapping carrier case, the candidate cell may prefer to reactivate another cell on another carrier that would suffer less interference from neighbors and possibly create less interference to neighbors. For the small original cell within macro coverage, the High Interference information may be used in combination with cell estimates, e.g., of time alignment, angle of arrival, historical data, neighbor cell measurements and other information internal to the coverage cell 106 in order to decide which original cells 105 to activate or to put into energy savings levels.

Figure 10:
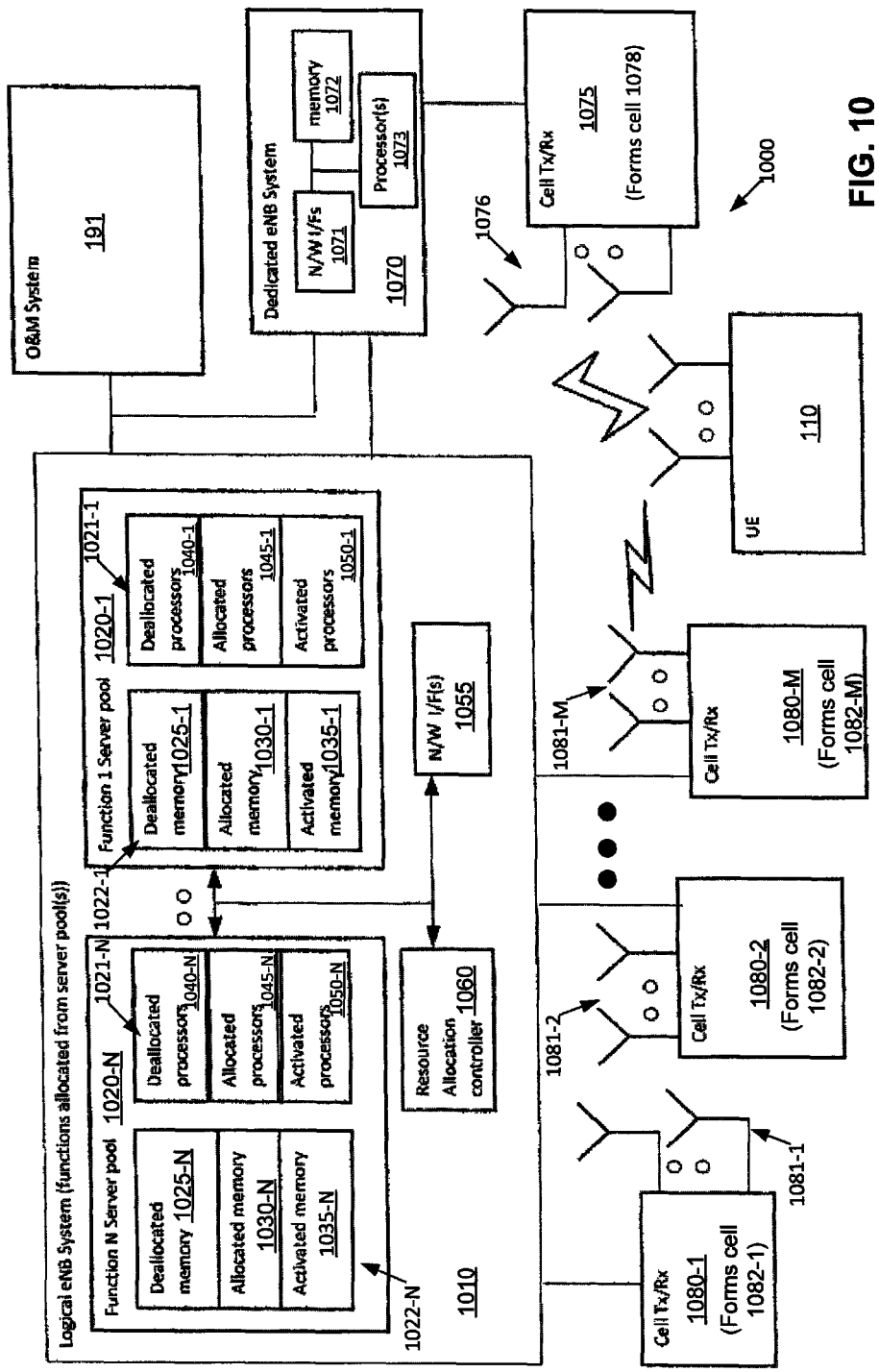
FIG. 10 is a block diagram of wireless network having a logical eNB system, in an exemplary embodiment.

The previous wireless network 100 included dedicated eNBs 107/108. A trend is occurring where the dedicated eNBs may be replaced by or supplemented by logical eNB systems. FIG. 10 is a block diagram of a wireless network 1000 having a logical eNB system 1010. The system 1000 includes a dedicated eNB system 1070, which includes one or more network interfaces (N/W I/Fs) 1071, one or more memories 1072, and one or more processors 1073. The dedicated eNB system 1070 is connected to the cell Tx/Rx hardware module 1075 and a number of antennas 1076. The cell Tx/Rx hardware module 1075 comprises, e.g., a transceiver (e.g., 160) and appropriate software or additional hardware to send and receive information via wireless links using antenna (s) 1076. The logical eNB system 1010 includes function 1 server pool 1020-1 through function N server pool 1020-N. Each function X server pool 1020 (where X is one of 1 through N) includes memories 1022, including deallocated memory 1025, allocated memory 1030, activated memory 1035, and processors 1021 including deallocated processors 1040, allocated processors 1045, and activated processor 1050. The logical eNB system 1010 also includes a resource allocation controller 1060 and one or more N/W I/Fs 1055. There are M cell Tx/Rx hardware modules 1080, each of which comprises antenna(s) 1081 and each of which forms a cell 1082. In this example, a UE 110 is in wireless communication with the cell Tx/Rx hardware module 1075 and the dedicated eNB system 1070 and the cell Tx/Rx hardware module 1080-*m* and the logical eNB system 1010.

Physical cells 1082 contain physical antenna(s) 1081 for transmission and reception of wireless signals to UEs 110 or other remote devices such as machine or computer equipment. Antenna(s) 1081 as well as other eNB functions are activated at a particular cell 1082 in order for the cell 1082 to be operational. Other functions include radio down/up conversion functions and L1, L2, L3 functions. Processors 1021 and associated memory 1022 are used to implement these functions. L1 PHY resources typically connect to the cell Tx/Rx hardware modules 1080 via a CPRI (Common Public Radio Interface), especially if the cell Tx/Rx hardware module 1080 is remote from the other functions. With a dedicated eNB system 1070, the functions are always dedicated to the cell 1078 and only that cell 1078, as shown by the dedicated eNB system 1070.

Logical eNB systems 1010 contain pooled resources of processors 1021, memory 1022 and any other necessary logic to implement various desired functions necessary to fulfill a node being e.g. an LTE eNB. Processors 1021 may be of a general type or optimized to perform certain functions such as DSPs for digital signal processing (DSP) or other specialized processor types that can be made to implement specific tasks such as encryption and header compression (associated with the L2 PDCP function). DSPs are often associated with L1 (layer 1) functions. LTE eNB resource functions typically are split into different layers such as Layer 1 (PHY), layer 2 (MAC, RLC, PDCP), and layer 3 (RRC/RRM). The different functions can be associated with separate pool servers that can be allocated to perform said function such that separate pools provide the different functions, e.g., a layer 1 pool server, a L3 RRC pool server, and the like.

The pooled resources (e.g., including processors 1021 and memory 1022) are allocated and deallocated to physical cells (e.g., cell Tx/Rx hardware modules 1080, which form corresponding cells) by a resource allocation controller 1060. When resources are allocated, parts of the pool(s) take on the role necessary for there to be a particular eNB that can transmit and receive with UEs 110. The same occurs for the memory and any other associated logic such that the complete list of functionality that needs to be performed by an eNB is allocated by a resource allocation controller 1060. The allocated resources may be further activated (e.g., activated processor 1050 and activated memory 1035) in order to transmit/receive wireless signals or deactivated (e.g., allocated processors 1045 and allocated memory 1030) in order to save energy by the processors and/or memory.

When deallocated, the resources (e.g., processor 1040 and memory 1025) are not associated with a particular eNB cell and are free to be allocated to any particular cell 1082 when a node requests resources, e.g. when a cell 1082 needs to be activated soon in order to provide wireless access to remote user or other machine/computer type devices benefitting from service to that cell 1082. In the figure, the cells 1082-1 and 1082-2 are not activated. In order for a cell to be activated, resources must be allocated. Allocated resources need not be activated.

Thus node functions (e.g., for an LTE eNB) may be dedicated to a particular cell 1082 or reside in logical resource pools (e.g., function x server pools 1020) which can be dynamically allocated to different cells 1080 based on a need basis, e.g., upon request from a neighbor eNB via a inter-node (e.g. X2) interface or via O&M system 191 based on a south bound interface. All eNB functions may be dedicated to a particular cell 1078, as shown by the eNB system 1070. This is the typical case for current eNB equipment.

It should be understood that a cell 1082 may be composed of different combinations of its functions being performed using dedicated resource function(s) or logical resource functions existing in resource pool servers such as those shown as function x server pool 1020. For instance, the L3 eNB function may be contained within a logical function x server pool 1020, while the L2, L1, and high frequency radio related functions are dedicated to a particular cell 1082. Alternately, the L3, L2, L1 functions may be contained within a logical function x server pool 1020 while the high frequency radio related functions are dedicated to a particular cell 1082. Resources may be in close proximity or remote from the antenna(s) 1081.

Besides providing a means to differentiate ES levels (e.g., shutdown versus sleeping) and corresponding reactivation times associated with dedicated hardware and/or software, a cell may have a virtual existence represented by parameters such as antenna latitude and longitude, frequency band (UL/DL), and transmission power, thereby mapping to a potential cell coverage area when activated. This may include supporting an interface(s) to neighbor cells in accordance with proprietary or standard interfaces such as the LTE TS 36.423 (X2AP) interface. The interface such as LTE X2 may be established and set up indicating the virtual cells attributes, e.g., ECGI (Enhanced Cell Global Identity), PCI (Physical Cell Identity), EARFCN (E-UTRA Absolute Radio Frequency Channel Number, where E-UTRA is Evolved Universal Terrestrial Radio Access), TAC (Tracking Area Code), and bandwidth in accordance with agreed interface parameters to be exchanged. The coverage area and/or coverage overlap with other cells may be made known to neighbors via appropriate attributes, e.g., the is ESCoveredby attribute defined in TS 32.762. But other hardware and software functions may not be available/allocated for a cell 1080 that is deactivated/dormant and saving energy, e.g., in a resource pooled environment where functions are shared in a pool and code memory has been turned off for energy savings. In such instances, the cell 1082 should indicate the cell 1082 is deactivated to a level representing a long reactivation time (e.g., deallocated, deep level of dormant cell, shutdown, a large value for the amount of functions deactivated on a scale of 0-100, e.g. 95 percent deactivated).

When the network (e.g., an EMS, Element Management System, or alternately a node controller within a distributed architecture or the logical eNB system itself) determines that the virtual cell or cells 1082 should become physically instantiated as the cells services/activation will be or are anticipated to be possibly useful to serve UE subscribers (e.g., surrounding and/or overlay/underlay cell load utilizations have increased, surrounding and/or overlay/underlay nodes have activated themselves and/or changed their ES level such that their reactivation time is shorter), the network then sends a proposed CELL ALLOCATION REQUEST message to the shutdown/deallocated node (corresponding to a cell 1082), given the node/cell 1082 has indicated the cell 1082 is deallocated. Autonomously, the node by itself may decide the node needs to reactivate or reallocate cell resources. The controller for the shutdown cell then attempts to allocate actual physical resources which are currently not allocated to the cell(s) (may have been erased when memory powered off when the cell object resources were previously deallocated). The resources only exist and run in a centralized pool 1020 or multiple centralized pools 1020, each dedicated to supporting different applications, e.g., an L3 application, an L2 application, and the like. Pool servers may fulfill the requested cell functions based on desired UE capabilities, e.g., an L1 capability with requested attributes LTE Rel-10/hopping, 4×2 MIMO, . . . , LTE Rel-10 L2 functions with requested capabilities (type of RLC, type of PDCP, type of scheduler), L3 processor capabilities in accordance with, e.g., a certain standard version (3GPP LTE TS 36.331 Rel-10a5.0), user bearer plane, and the like. The request may include a maximum capacity amount in terms of number of UEs/data rate that the requested technology is requested to support for the indicated cell(s) to allocate. Thus the pool server may allocate resources and capacity such that a common processing unit capable of supporting some multiple amount of cell types with a desired capacity adds the physical resources (e.g., processors 1050, memory 1035) for a cell 1082 to the mix. The reason is so that the cell 1082 can then transmit a specific type of technology (3G, 4G, 5G, etc.) to antenna(s) 1081 supporting a maximum requested amount of traffic.

Upon obtaining the requested resources, a response message is returned by the resource pool server to an external requestor via the O&M interface or X2 interface using the N/W I/Fs (1055) and the functions physically allocated for the dormant/shutdown cell. Optionally this may involve download of function(s) to a processor 1021 more local to the actual cell location in order to minimize processing delays when the cell is actually activated and transmitting over the air.

The receiving cell may acknowledge immediately the reception of the Cell Allocation Request if the time to actually fulfill the request is expected to be long (e.g., minutes or more), thereby allowing the sender to know that the request has been received and is being worked on. The response may indicate a successful outcome even if a few capabilities attributes of the requested functions could not be fulfilled as long as sufficient capability can be allocated to activate a cell with some complete technology feature set. After the resources have been allocated, the cell may be further actually activated when deemed necessary by, e.g., an X2:Cell ACTIVATION REQUEST message. This then results in wireless transmission/reception between the network and UE within the coverage area of the cell 1082.

Unfulfilled capability attributes should be indicated in, e.g., a CELL ALLOCATION RESPONSE message. Return of an unsuccessful response may include a reason (e.g., function(s) not available) and optionally any expected additional wait time if the capability exists but resources are currently being used by other cells. The requester may then send a CELL ALLOCATION STOP message if the requester does not wish to wait, e.g., if there is another server using different resource pool(s) the requester decides to try instead or if compensation or service may be provided via other available resources within the network. Else, the requester may continue to wait.

Alternately, an unsuccessful outcome response may indicate that while 5G cell instantiation/allocation is not possible, 4G allocation is. The network may then decide to allocate and subsequently activate the cell using a different type of base station technology as originally desired.

When cell load(s) decrease, upon given policies (e.g., cell load) either internal to the node or configured via O&M system 191, the cell 1082 is deactivated. Deactivation including the proposed addition of the level of deactivation is indicated over the interface. Power may completely be turned off in all but a function that supports an interface to O&M system 191 and neighbor nodes (e.g., a shutdown case). Or portions of the cell 1082 are deactivated but memory containing cell software is maintained such that the cell can be reactivated quickly (e.g. milliseconds). If the cell functions were hosted in a server pool 1020, the functions may be kept in a sleep mode (resources still reserved and available for quick reactivation, such as in allocated processors 1045 and allocated memory 1030) or unallocated and returned to the available free pool of resource functions (such as in deallocated processor 1040 and deallocated memory 1025). These free resources may then be understood to be turned off for ES reasons and a reactivation time understood to be of a longer duration, as resources would need to be reallocated before the cell can go In Service (INS). The impact regarding expected interface (e.g., O&M or X2) message response delay from the deactivate condition (sleeping/shutdown/deallocated) to another condition (e.g., activated) may be explicitly indicated over the interface, where the sending node is aware of the time as part of its configuration parameters or measuring the delay itself. Alternately, the receiving node may learn the expected delay via measuring the delay itself after receiving messages indicating ES level changes a few times.

Figure 11:
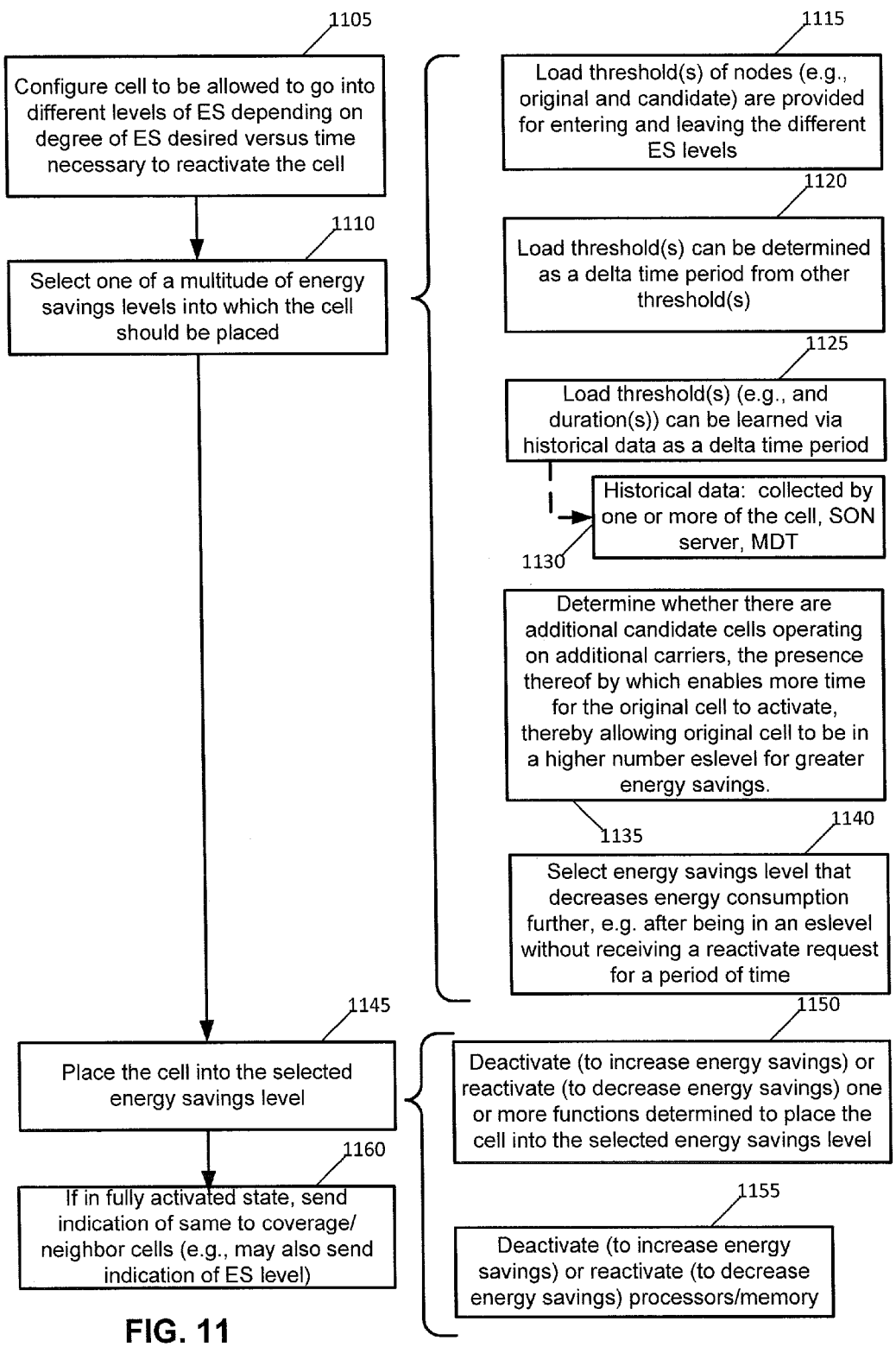
FIGS. 11 and 12 are block diagrams of flowcharts performed by a base station for enabling different base station ES levels based on time to activate a cell.
Figure 12:
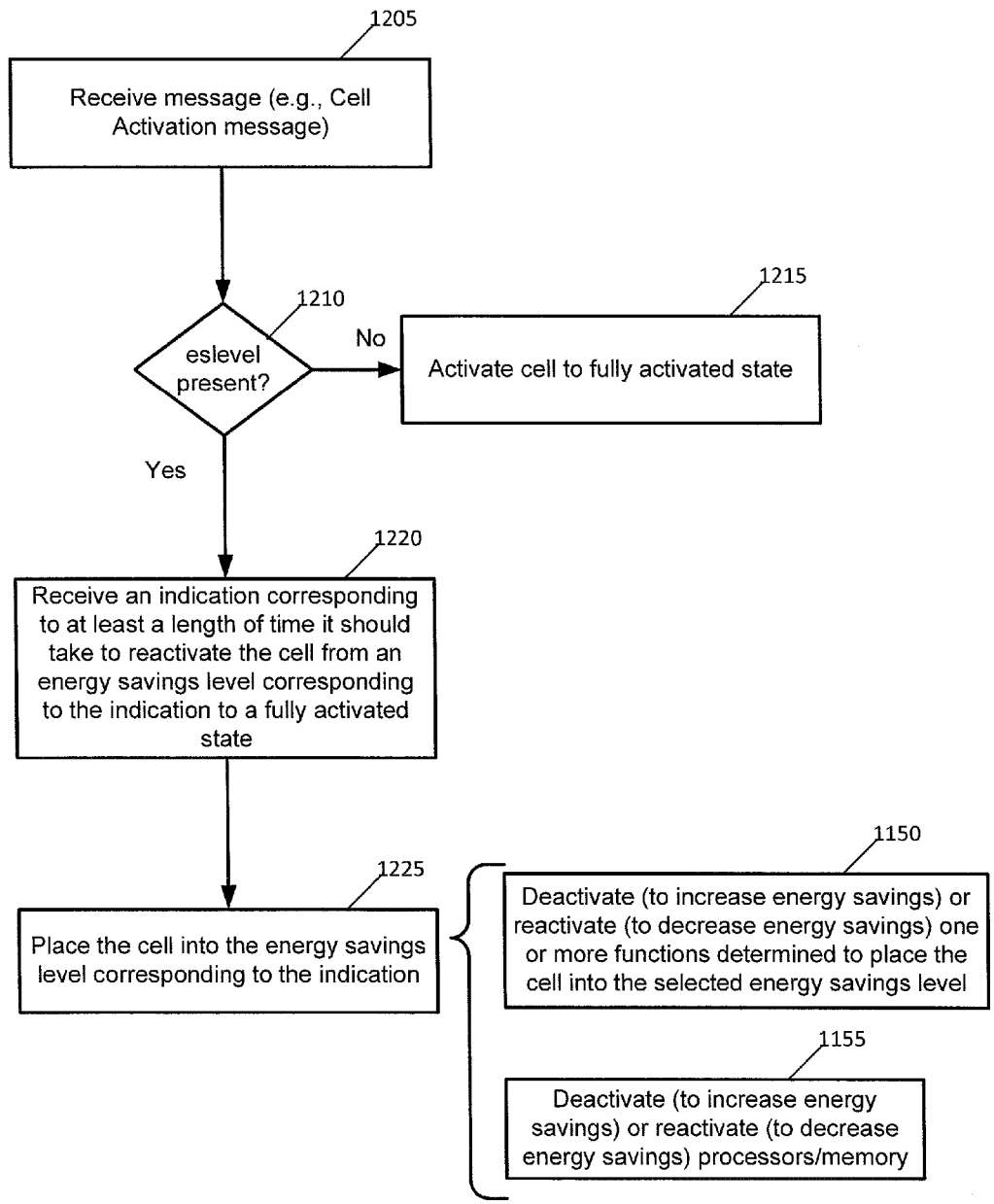

FIGS. 11 and 12 are block diagrams of flowcharts performed by a base station for enabling different base station ES levels based on time to activate a cell. FIG. 11 is for a distributed scenario, where the base station primarily makes a determination as to which ES level the base station should be in and the base station transitions itself into the ES level. FIG. 12 is for a centralized scenario (although it is also applicable to a distributed scenario), where the base station receives instructions as to which ES level the base station should be in and the base station transitions itself into the ES level. Further, the coverage cell is configured such that the ES function is enabled and that the distributed mechanism is used. Policies (e.g., thresholds) and neighbors are also configured or learned. Once configured, the coverage cell then sends messages when the coverage cell decides the original cell should be activated. The original cell may also decide to deactivate based on its own configured policies. That is, there may be a distributed ES method, where O&M system 191 can configure the original cell 105 to allow the original cell 105 to go into eslevels, indicating a distributed ES mechanism should be used, and configure policy thresholds. Then the original eNB goes into ES state based on policies. This method is illustrated by FIG. 11 and also FIG. 12. There can be a centralized ES method where O&M system 191 configures the eNBs (e.g., 108 and/or and 107) to go into a particular eslevel.

It is noted that there may be situations for which both scenarios are valid. For example, a network may configure a base station with some responsibility for determining which ES level the base station should be in, while also providing other instructions to cause the base station to transition to different ES levels. It should be noted that the term "cell" is used in these figures, and it should be understood that a base station performs the actions and also forms the cell. The operations in FIGS. 11 and 12 may be the operations of a method, the operations of an apparatus caused by a computer program code stored on a computer-readable storage medium, or operations of hardware (e.g., executing a software program, or configured to perform the operations, or both). Also, FIGS. 11 and 12 are assumed to be performed by an eNB 108, which forms a capacity booster/original cell 105. For simplicity, the term "original cell" is used in FIGS. 11-13, and the corresponding term of "candidate cell" is used for the coverage/candidate cell 106. It is further noted that the "original cell" in FIGS. 11 and 12 may also be a logical eNB and cell formed by the logical eNB system 1010 of FIG. 10.

In block 1105 of FIG. 11, the original cell is configured to be allowed to go into different levels of ES depending on degree of ES desired versus time necessary to reactivate the cell. This configuration may be via one or more messages between the original cell 105 and a network entity, such as the O&M server 191. Based at least in a part on the configuration, the original cell 105 selects (block 1110) one of a multitude of energy savings levels 730 into which the cell should be placed. FIG. 4 provides an example of four possible energy savings levels and their corresponding indications 410 (of first, second, third, rxonly); FIG. 5 provides an example of three possible energy savings levels 720 and their corresponding indications 410 (of short, medium, long); and FIG. 6 provides an example of the potential of having many possible energy savings levels. FIG. 7 shows how the energy savings levels 730 may be achieved. Block 1110 may be performed using a number of techniques, and blocks 1115-1140 provide examples of these techniques.

In block 1115, the original cell selects the energy savings level 730 based in part on load threshold(s) of nodes (e.g., original and candidate), which are provided (e.g., via block 1105) for entering and leaving the different ES levels. For example, the original cell may go dormant first to eslevel 1. The cell can continue to receive indications of the load of the coverage cell and based on the coverage cell's load decreasing further, may go to a higher eslevel representing more energy savings. In multicarrier cases, the cell can receive indications of the loads of multiple (candidate) coverage cells and base decisions on the load across all carriers. In block 1120, the original cell 105 determines load threshold(s) as a delta time period from other threshold(s). As described above, the delta time period represents how much load is expected to change in a given time period. In block 1125, the original cell can learn load threshold(s) (e.g., and duration(s)) via historical data as a delta time period. As indicated in block 1130, the historical data may be collected by one or more of the cell, a (C-)SON server, or O&M (e.g., O&M system 191). The historical data may be used by the original cell 105 to select energy savings levels, such as if there is typically low load during certain times (e.g., when a an energy savings level is selected to allow high energy savings), or if there is a delta time period indicating at particular times the load typically increases rapidly (e.g., when a an energy savings level is selected to allow low energy savings but fast recovery).

In block 1135, the original cell 105 may determine whether there are additional overlapped original cells 106 operating on additional carriers. The presence of the additional original cells 105 and/or candidate cells 106 operating on additional carriers enables more time for the original cell 105 to activate to handle loads, thereby allowing the original cell 105 to be in a higher number eslevel (e.g., an energy savings level with higher energy savings than lower numbered eslevels) for greater energy savings. The cells on the other carriers should be understood to have a lower priority to go to a higher number eslevel based on factors such as configuration and/or the activation, deactivation status of neighbor cells on the other carrier. In block 1140, the original cell 105 selects the energy savings level that decreases energy consumption further relative to a current energy savings level, e.g., after being in an eslevel (e.g., the current energy savings level) without receiving a reactivate request for a period of time.

In block 1145, the original cell 105 places the cell into the selected energy savings level 730. This may be performed by (see block 1150) deactivating (to increase energy savings) or reactivating (to decrease energy savings) one or more functions 710 determined to place the cell into the selected energy savings level. For instance, as shown in FIG. 7, the functions 710 of the PA, Rx, and radio Tx may be deactivated to move from a fully activated state to an energy savings level 730 corresponding to the indication 410 of "first". As another example, the functions 710 of the clock oven, the L3, L2, L1 and XCVR may be reactivated to move from an energy savings level 730 corresponding to the indication 410 of "third" to the energy savings level 730 corresponding to the indication 410 of "first" (wherein the PA, Rx, and radio Tx remain deactivated). Another example of block 1145 is shown in block 1155, where the processors/memory are deactivated (to increase energy savings) or reactivated (to decrease energy savings). For instance, in FIG. 10, deactivating processors and memory could entail assigning activated processors 1050 and activated memory 1035 corresponding to an original cell 105 to allocated processors 1045 and allocated memory 1030, respectively. Reactivating processors and memory could entail assigning allocated processors 1045 and allocated memory 1030 corresponding to an original cell 105 to activated processors 1050 and activated memory 1035, respectively.

A fully activated cell notifies neighbors, including the covering cell, of an update to its activated status. See block 1160. This is done in LTE by sending an X2:eNB CONFIGURATION UPDATE message without including the Deactivation Indication IE. By receiving notification of the cell's activated status, the cell is understood (by cells receiving the status) to be transmitting and receiving Uu messages and should accept handover requests. It is noted that it also may be possible for the cell to notify the candidate/neighbor cells a current energy savings level of the original cell.

FIG. 12 is an example of a centralized scenario, e.g., where the original cell 105 is receiving instructions from a network entity such as O&M system 191. It should also be noted that this figure can apply to the decentralized scenario, too, as an original cell is still able to receive instructions from, e.g., the O&M system 191. In block 1205, the original cell 105 receives configuration data from O&M including messaging to go into a level of energy savings as given in FIG. 4, e.g. a configuration attribute corresponding to an eslevel of first, second, third, rxonly. In block 1210, the original cell 105 determines if the eslevel attribute is present. If not (block 1210=No), then the original cell (in block 1215) activates the cell to a fully activated state.

It should be noted that the centralized ES method, i.e., a node in this case the original cell is both configured and controlled for ES by O&M, can apply to FIG. 10. With the centralized method, X2AP messaging between eNBs is not used for activation and deactivation of cells for ES, so there is no CELL ACTIVATION REQUEST message which appears in block 1205. O&M (e.g., system 191) controls whether cell is activated or deactivated.

If the eslevel is present (block 1210=Yes), in block 1220, the original cell therefore receives (e.g., from the eslevel IE in the message) an indication 410 corresponding to at least a length of time it should take to reactivate the cell from an energy savings level 730 corresponding to the indication 410 to a fully activated state. In block 1225, the original cell 105 places the cell into the energy savings level 730 corresponding to the indication 410. Block 1225 may be performed by blocks 1150 and 1155, which are described above in reference to FIG. 11. Block 1160 may also be performed.

It is noted that FIG. 12 is merely one possible example using no indication of an energy savings level, where the lack of indication means that the cell should return to the fully activated state. However, the indication 410, e.g., the eslevel IE, could indicate a request to return to the fully activated state. For example, in FIG. 4, the indications 410-1 include first, second, third, and rxonly, but there could also be an indication, e.g., of "zero" or "activate", which indicates to the cell that the cell should return to the fully activated state.

Figure 13:
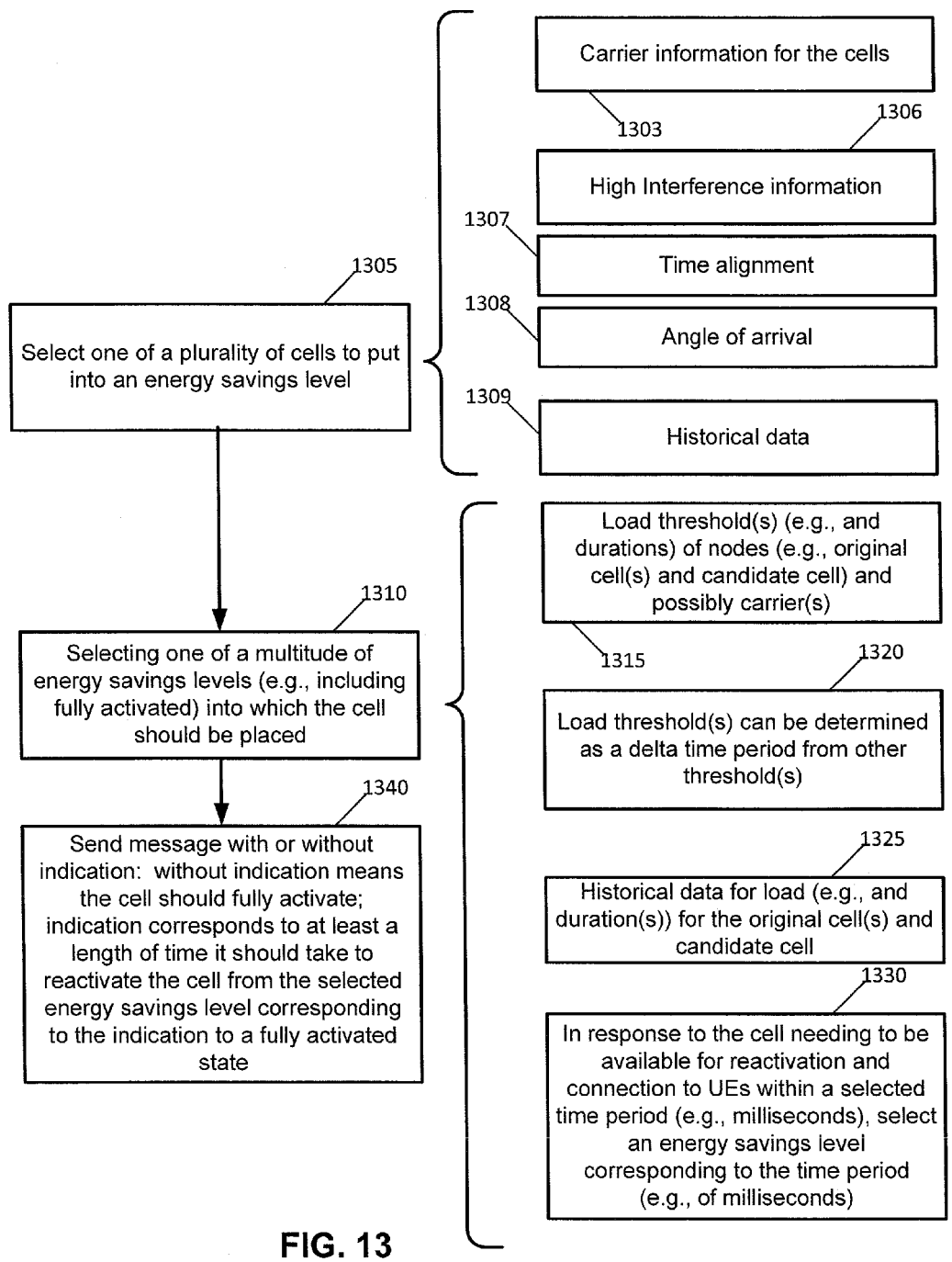
FIG. 13 is a block diagram of a flowchart performed by a network entity for enabling different base station ES levels based on time to activate a cell.

Turning to FIG. 13, a block diagram is shown of a flowchart performed by a network entity for enabling different base station ES levels based on time to activate cell. The network entity may be a coverage/candidate cell 106, or other network entities such as an O&M system 191. The example of FIG. 13 therefore might serve for actions of the candidate cell 106 (if in distributed mode) or O&M system 191 (or a SON/C-SON server) (if in centralized mode). This could serve for FIG. 10 where the allocations/activations are requested by candidate cell or configured by O&M. The operations in FIG. 13 may be the operations of a method, the operations of an apparatus caused by a computer program code stored on a computer-readable storage medium, or operations of hardware (e.g., executing a software program, or configured to perform the operations, or both).

In block 1305, the network entity (e.g., candidate cell 106 or O&M system 191) selects one of a multitude of cells to put into a particular energy savings level 730, include activating or deactivating the cell. The network entity can perform block 1305 by performing exemplary blocks 1303 and 1306-1309. The network entity selects the cell (e.g., and blocks 1305, 1310, and 1340 may be performed for multiple cells) based on carrier information for the cells. That is, if there are multiple overlying/underlying/overlapping cells with multiple carriers, the network entity can put certain cells with certain carriers into higher energy savings levels (i.e., requiring longer time periods to transition to the fully activated state), and put other cells with certain other carriers into lower energy savings levels (i.e., requiring shorter time periods to transition to the fully activated state). For example, assume two macro cells overly each other (that is, perhaps the two cells have the same coverage area), but use two different carriers. One cell with a first carrier can be selected to be placed into fully activated state, while the second cell with a second carrier can be placed into a deactivated lower energy savings level, allowing the second cell to activate in a short time. More complex scenarios can exist, e.g., where an operator has four carriers in an area on a combination of macro and pico cells, and a first macro cell with a first carrier can be placed into a fully activated state, a second macro cell overlying the first macro cell and having a second carrier can be placed into a low energy savings level, while a third macro cell with a third carrier is placed into a medium energy savings level, and a pico cell with a fourth carrier could be placed into a high energy savings level.

For, e.g., a small original cell 105 within macro coverage, High Interference information 1306 may be used in order to decide which original cells 105 to activate or to put into energy savings levels. This example is for a particular case regarding which pico to fully activate and involved possibly putting pico cells in an rxonly energy savings level (see FIGS. 4 and 9) first to aid in the interference determination. As another example, node (e.g. macro or pico) cells (e.g., on overlapping different carriers) may be placed into the rxlevel energy savings level to measure interference of neighbor cells. If a first node cell in the rxlevel energy savings level sees high interference and another cell that overlays the first sees less, than the cell seeing less interference should be activated or placed into a higher power ES level (i.e., requiring a shorter time period to reactivate) while the cell seeing more interference is signaled to go into a lower power ES level (i.e., requiring a longer time period to reactivate).

Alternatively or in addition, cell estimates, e.g., of time alignment 1307, angle of arrival 1308, measurements of neighbors and historical data 1309 (e.g., and other information internal to the coverage cell 106) may be used in order to decide which original cells 105 to activate/deactivate or to put into energy savings levels (such as increasing or decrease the energy savings levels). For instance, for time alignment 1307, this may be used to estimate a distance a UE 110 is from an antenna of the cell. The angle of arrival 1308 can be used to determine arch which when combined with time alignment estimates if a UE may enter (or may not enter) the coverage area of a small original cell. Measurements of neighbors can determine the UE is closer to a neighbor cell received with higher power than a neighbor cell received with lesser power. Historical data 1309 may be used to determine at which times there are high loads for the candidate cell 106 (and therefore one or more original cells 105 may have to be activated or put into energy savings levels corresponding to lower time periods to reactivate). The opposite is also true, historical data 1309 may be used to determine at which times there are low loads for the candidate cell 106 (and therefore one or more original cells 105 may be deactivated or put into energy savings levels corresponding to higher time periods to reactivate). The historical data 1309 may also be used for the original cells 105 themselves, e.g., if it is known that an original cell's coverage area has a high level of load during weekend evenings, the candidate cell can activate the original cell 105 or put the original cell 105 into energy savings levels corresponding to a lower time period to reactivate. Additionally, if it is a small cell within a candidate macro coverage area, then the locality (e.g., as determined by TA and angle of arrival 1308) of UEs matter. If the original cell 105 is another macro cell on, e.g., carrier f2 (a second frequency) covered by a macro cell on f1 (a first frequency), then UEs using f2 may be able to be moved to f1.

Another set of examples as to what may be more important for determining if a cell should change its activation state include load thresholds 1115/1315, 1120/1320, 1130/1325 and the state of any overlay/underlay cells (1135), and the examples are as follows. As load decreases in an area, and there are multiple overlay cells say f1-cell x (a cell x operating on carrier f1), f2-cell y, f3-cell z, f4-cellzz, cells begin to go dormant. So assume an operator has four carriers. Which cells (e.g., corresponding to individual carriers) are deactivated may be influenced by whether neighbor cells on same frequency are activated or not. That is if macro neighbor cells are active on f1, f2, f4, but not f3, then f4-cell zz may be deactivated. If load decreases further, then f4-cell zz goes to a lower power eslevel (requiring a longer time period to reactivate) and f2-cell y is deactivated to eslevel 1/first (e.g., requiring a short time period to reactivate). Thus interference to neighbors on carriers f2 and f4 is reduced by deactivating the cells on these frequencies when the cells are not needed. F3-cell z stays activated as this cell is not receiving interference from neighbor since neighbor is deactivated. In a typical situation, there is more than one neighbor, but the idea is similar in that, in an exemplary embodiment, cells which minimize interference are deactivated. This is where placing a cell in an rxlevel energy savings level may help in determining the neighbor interference, though simply knowing the activation or deactivation status of neighbors which is indicated, e.g., via X2 eNB CONFIGURATION UPDATE messages may be enough to choose which overlay cells to change eslevel. In this use case, the system is deciding which overlay cells of a type (e.g., overlaid pico cells or overlaid macro cells) should change their eslevel. Overlaid macro cells and pico cells may also perform these decisions in parallel.

In other cases, e.g., if particular UEs such as roaming UEs are limited in the carriers they can access or avoiding inter-cell handovers is preferable to reducing interference, then cells are deactivated across the same carriers. In this case, cells on f4 may be deactivated to energy saving level 1 (corresponding to lower time periods to reactivate) when capacity across all carriers is not needed. If carrier loads reduces further, cells on f3 may be deactivated but to an energy saving level 1 (corresponding to lower time periods to reactivate) and cells on f4 have more functions deactivated resulting in a medium energy savings level 2.

In block 1310, the candidate cell 106 selects one of a multitude of energy savings levels 730 (e.g., including fully activated) into which the original cell 105 should be placed. Possible examples of block 1310 are shown in blocks 1315 to 1330. In block 1315, the network entity performs selection of an energy savings level 730 based upon load threshold(s) (e.g., and time durations of loads surpassing the thresholds) of nodes (e.g., original cell(s) and candidate cell) and possibly carrier(s). As an example, if the candidate cell 106 determines the load of the candidate cell meets a threshold (e.g., is above a threshold) and the original cell 105 is in an energy savings level 730, the candidate cell 106 can select a different energy savings level 730 for the original cell.

In block 1320, the candidate cell 106 selects the energy savings level based upon load threshold(s), which can be determined as a delta time period from other threshold(s). See the description above for delta time periods. In block 1325, the candidate cell 106 or O&M system (191) can select the energy savings level 730 by using historical data for load (e.g., and duration(s)) for the original cell(s) and the candidate cell. For example, if the historical data indicates the original cell 105 is in the fully activated state during a large portion of the working hours of a work day (or after the working hours of a work day and in daylight hours on a weekend), the candidate cell 106 could select an energy savings level 730 that should take very little time for the original cell 105 to reactivate the cell.

In block 1330, the candidate cell 106 can, in response to the original cell 105 needing to be available for reactivation and connection to UEs within a selected time period (e.g., milliseconds), select an energy savings level corresponding to the time period (e.g., of milliseconds). For instance, if the coverage cell 106 is nearing a high load threshold, the coverage cell 106 could select an energy savings level of the original cell 105 that places the original cell in a energy savings level 730 with a short length of time (e.g., milliseconds) it should take to reactivate the cell from the selected energy savings level 730 to a fully activated state. As an opposite example, if the coverage cell 106 is nearing a low load threshold, the coverage cell 106 could select an energy savings level of the original cell 105 that places the original cell in a energy savings level 730 with a high length of time (e.g., seconds) it should take to reactivate the cell from the selected energy savings level 730 to a fully activated state. This will save additional power.

In block 1340, in an exemplary embodiment, the candidate cell 106 sends a message (e.g. the X2 Cell ACTIVATION REQUEST message when using the distributed mechanism) with or without an indication 410 of the energy savings level: without the indication means the cell should fully activate; with the indication 410 means the indication corresponds to at least a length of time it should take to reactivate the cell from the selected energy savings level corresponding to the indication to a fully activated state.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memory 136, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method for modifying energy savings levels of a cell, comprising:
   communicating, by an apparatus, an indication corresponding to at least a length of time it should take to reactivate a cell from an energy savings level corresponding to the indication to a fully activated state; and
   placing the cell into the energy savings level corresponding to the indication by the apparatus, wherein:
   the energy savings level is a selected one of a plurality of energy savings levels, each of the plurality of energy savings levels corresponding to a length of time it should take to reactivate the cell from the energy savings level to a fully activated state.

2. The method of claim 1, wherein:
   communicating further comprises receiving the indication corresponding to at least the length of time it should take to reactivate the cell from an energy savings level corresponding to the indication to the fully activated state; and
   placing further comprises, responsive to receiving the indication, placing the cell into the energy savings level corresponding to the indication.

3. The method of claim 1, wherein:
   communicating further comprises transmitting the indication corresponding to at least the length of time it should take to reactivate the cell from the energy savings level corresponding to the indication to the fully activated state; and
   placing further comprises placing, prior to transmitting, the cell into the energy savings level corresponding to the indication.

4. The method of claim 1, wherein:
   the method further comprises selecting the selected energy savings level from the plurality of energy savings levels; and
   placing further comprises placing the cell into the selected energy savings level.

5. The method of claim 4, wherein selecting the selected energy savings level from the plurality of energy savings levels further comprises at least one of:
   using at least one or more load thresholds of the cell and one or more load thresholds of cells being neighbors to the cell in order to select the selected energy savings level from the plurality of energy savings levels;
   using at least a delta time period representing how much load is expected to change in a given time period in order to select the selected energy savings level from the plurality of energy savings levels;
   the cell operating on a carrier, using at least a determination whether there are additional overlapped cells operating on additional carriers in order to select the selected energy savings level from the plurality of energy savings levels; or
   selecting an energy savings level that decreases energy consumption further relative to a current energy savings level, in response to being in the current energy savings level without receiving a reactivate request for a period of time.

6. A method for modifying energy savings levels of a cell, comprising:
   selecting, by an apparatus, an energy savings level for a cell, the energy savings level corresponding to a length of time it should take to reactivate the cell from the energy savings level to a fully activated state; and
   communicating from the apparatus to the cell an indication corresponding to at least the length of time it should take to reactivate a cell from the selected energy savings to the fully activated state,
   wherein there are a plurality of energy savings levels, each of the plurality of energy savings levels corresponding to a length of time it should take to reactivate the cell from the energy savings level to a fully activated state.

7. The method of claim 6, further comprising selecting the cell to which the indication is to be communicated from a plurality of cells,
wherein selecting further comprises selecting the selected cell based on interference information received from the selected cell.

8. The method of claim 7, wherein in response to the interference information indicating high interference in a cell having a coverage area overlapping a coverage area of another cell, not selecting the cell having a coverage area overlapping the coverage area of the other cell.

9. The method of claim 7, wherein in response to the interference information indicating high interference in a cell having a coverage area underlying a coverage area of another cell, selecting the cell having a coverage area underlying the coverage area of the other cell.

10. The method of claim 6, wherein selecting further comprises at least one of:
selecting the selected cell based on carrier information from the plurality of cells; or
selecting the selected cell based on one or more of time alignment of one or more user equipment in the cell, angle of arrival of one or more user equipment in the cell, or historical data for the cell.

11. The method of claim 6, wherein selecting the selected energy savings level from the plurality of energy savings levels further comprises at least one of:
the cell being an original cell providing capacity for a candidate cell, using at least one or more load thresholds of one or both of the original and candidate cells in order to select the selected energy savings level from the plurality of energy savings levels;
using at least one or more time durations, controlling how long a load must be at a corresponding threshold for a cell before an energy savings level change is allowed to occur to the cell, in order to select the selected energy savings level from the plurality of energy savings levels; or
using at least a delta time period representing how much load is expected to change for the cell in a given time period in order to select the selected energy savings level from the plurality of energy savings levels.

12. An apparatus for modifying energy savings levels of a cell, comprising:
at least one processor; and
at least one memory including computer program code, the at least one memory and the computer program code configured with the at least one processor, to cause the apparatus to perform at least the following:
communicating, by the apparatus, an indication corresponding to at least a length of time it should take to reactivate a cell from an energy savings level corresponding to the indication to a fully activated state; and
placing the cell into the energy savings level corresponding to the indication by the apparatus, wherein:
the energy savings level is a selected one of a plurality of energy savings levels, each of the plurality of energy savings levels corresponding to a length of time it should take to reactivate the cell from the energy savings level to a fully activated state.

13. The apparatus of claim 12, wherein:
communicating further comprises receiving the indication corresponding to at least the length of time it should take to reactivate the cell from an energy savings level corresponding to the indication to the fully activated state; and
placing further comprises, responsive to receiving the indication, placing the cell into the energy savings level corresponding to the indication.

14. The apparatus of claim 12, wherein:
communicating further comprises transmitting the indication corresponding to at least the length of time it should take to reactivate the cell from the energy savings level corresponding to the indication to the fully activated state; and placing further comprises placing, prior to transmitting, the cell into the energy savings level corresponding to the indication.

15. The apparatus of claim 12, wherein:
selecting further comprises selecting the selected energy savings level from the plurality of energy savings levels; and
placing further comprises placing the cell into the selected energy savings level.

16. The apparatus of claim 15, wherein selecting the selected energy savings level from the plurality of energy savings levels further comprises at least one of:
using at least a delta time period representing how much load is expected to change in a given time period in order to select the selected energy savings level from the plurality of energy savings levels;
the cell operating on a carrier, using at least a determination whether there are additional overlapped cells operating on additional carriers in order to select the selected energy savings level from the plurality of energy savings levels; or
selecting an energy savings level that decreases energy consumption further relative to a current energy savings level, in response to being in the current energy savings level without receiving a reactivate request for a period of time.

17. The apparatus of claim 12, wherein the apparatus is a base station.

18. An apparatus for modifying energy savings levels of a cell, comprising:
at least one processor; and
at least one memory including computer program code, the at least one memory and the computer program code configured with the at least one processor, to cause the apparatus to perform at least the following:
selecting, by the apparatus, an energy savings level for a cell, the energy savings level corresponding to a length of time it should take to reactivate the cell from the energy savings level to a fully activated state; and
communicating from the apparatus to the cell an indication corresponding to at least the length of time it should take to reactivate a cell from the selected energy savings to the fully activated state,
wherein there are a plurality of energy savings levels, each of the plurality of energy savings levels corresponding to a length of time it should take to reactivate the cell from the energy savings level to a fully activated state.

19. The apparatus of claim 18, further configured to perform selecting the cell to which the indication is to be communicated from a plurality of cells,
wherein selecting further comprises selecting the selected cell based on interference information received from the selected cell.

20. The apparatus of claim 19, wherein in response to the interference information indicating high interference in a cell having a coverage area overlapping a coverage area of another cell, not selecting the cell having a coverage area overlapping the coverage area of the other cell.

21. The apparatus of claim 19, wherein in response to the interference information indicating high interference in a cell having a coverage area underlying a coverage area of another cell, selecting the cell having a coverage area underlying the coverage area of the other cell.

22. The apparatus of claim 18, wherein selecting further comprises at least one of:

selecting the selected cell based on carrier information from the plurality of cells; or selecting the selected cell based on one or more of time alignment of one or more user equipment in the cell, angle of arrival of one or more user equipment in the cell, or historical data for the cell.

23. The apparatus of claim 18, wherein selecting the selected energy savings level from the plurality of energy savings levels further comprises at least one of:

the cell being an original cell providing capacity for a candidate cell, using at least one or more load thresholds of one or both of the original and candidate cells in order to select the selected energy savings level from the plurality of energy savings levels;

using at least one or more time durations, controlling how long a load must be at a corresponding threshold for a cell before an energy savings level change is allowed to occur to the cell, in order to select the selected energy savings level from the plurality of energy savings levels; or using at least a delta time period representing how much load is expected to change for the cell in a given time period in order to select the selected energy savings level from the plurality of energy savings levels.

24. The apparatus of claim 18, wherein the apparatus is one of:

an operations and maintenance system;

a self-optimizing network server; or a base station.

\* \* \* \* \*

UNITED STATES PATENT AND TRADEMARK OFFICE
CERTIFICATE OF CORRECTION

| | | |
|---|---|---|
| PATENT NO. | : 8,515,410 B1 | Page 1 of 1 |
| APPLICATION NO. | : 13/476466 | |
| DATED | : August 20, 2013 | |
| INVENTOR(S) | : Michael J. Bach | |

It is certified that error appears in the above-identified patent and that said Letters Patent is hereby corrected as shown below:

In the Claims

In Claim 16:
Column 22, line 24, "how," should be deleted and --how-- should be inserted.

Signed and Sealed this
Twenty-ninth Day of October, 2013

Teresa Stanek Rea
*Deputy Director of the United States Patent and Trademark Office*